United States Patent
Kar et al.

(10) Patent No.: US 11,225,542 B1
(45) Date of Patent: Jan. 18, 2022

(54) EROSION RESISTANT FOUNDRY SHAPES PREPARED WITH AN EPOXY-ACRYLATE COLD-BOX BINDER

(71) Applicant: ASK Chemicals LLC, Wilmington, DE (US)

(72) Inventors: Sritama Kar, Dublin, OH (US); Xianping Wang, Dublin, OH (US); Joerg Kroker, Powell, OH (US)

(73) Assignee: ASK CHEMICALS LLC, Wilmington, DE (US)

( * ) Notice: Subject to any disclaimer, the term of this patent is extended or adjusted under 35 U.S.C. 154(b) by 139 days.

(21) Appl. No.: 16/678,333

(22) Filed: Nov. 8, 2019

Related U.S. Application Data (60) Provisional application No. 62/758,051, filed on Nov. 9, 2018.

(51) Int. Cl.
| | |
|---|---|
| *C08F 283/10* | (2006.01) |
| *B22C 1/22* | (2006.01) |
| *C04B 26/06* | (2006.01) |
| *C04B 26/14* | (2006.01) |

(52) U.S. Cl.
CPC ............ *C08F 283/10* (2013.01); *B22C 1/222* (2013.01); *B22C 1/226* (2013.01); *C04B 26/06* (2013.01); *C04B 26/14* (2013.01)

(58) Field of Classification Search
CPC ....... B22C 1/222; B22C 1/226; B22C 1/2273; C08L 63/00–10; C08L 33/00–26; C04B 26/06; C04B 26/14
See application file for complete search history.

(56) References Cited

U.S. PATENT DOCUMENTS

| | | | | |
|---|---|---|---|---|
| 5,112,932 A | * | 5/1992 | Koenig | C08G 18/092 528/51 |
| 5,126,406 A | * | 6/1992 | Iwamoto | C08G 18/003 525/123 |
| 5,756,640 A | | 5/1998 | Dando et al. | |
| 5,880,175 A | * | 3/1999 | Archibald | B22C 1/22 523/142 |
| 7,122,583 B2 | * | 10/2006 | Kroker | B22C 1/222 523/147 |
| 7,723,401 B2 | | 5/2010 | Wang et al. | |
| 9,889,497 B2 | | 2/2018 | Wang et al. | |

* cited by examiner

*Primary Examiner* — Kregg T Brooks
(74) *Attorney, Agent, or Firm* — Standley Law Group LLP (57) ABSTRACT

Casting of non-ferrous metals, especially aluminum and magnesium, can have problems with erosion, in which molten metal contacts the mold or core surfaces during the pouring process, resulting in the sand being dislodged. Binder systems addressing this issue often use bisphenol F epoxy resin. A binder system is provided in which a major portion of the epoxy resin component is a bisphenol epoxy resin that has been modified by incorporating oxazolidone rings into an epoxy backbone of the bisphenol epoxy resin, especially a bisphenol A epoxy resin. The modification is preferably achieved by reacting the diglycidyl ether of the bisphenol with a methylene diphenyl diisocyanate.

16 Claims, 5 Drawing Sheets

EROSION RESISTANT FOUNDRY SHAPES PREPARED WITH AN EPOXY-ACRYLATE COLD-BOX BINDER

CROSS-REFERENCE TO RELATED APPLICATIONS

This application is a non-provisional of U.S. provisional application 62/758,051, filed on 9 Nov. 2018, to which this application makes a claim of priority. The provisional application is incorporated by reference as if fully-recited herein.

TECHNICAL FIELD

This invention relates to methods and compositions for use in the casting of non-ferrous metals, especially aluminum and magnesium. More particularly, the invention relates to the improvement of known binder systems to reduce erosion by replacing a major amount of a bisphenol F epoxy resin in the binder system with a bisphenol A epoxy resin that has been modified by reaction with methylene diphenyl diisocyanate.

BACKGROUND

The applicant has been long interested in the issues arising in the molten metal casting industry when non-ferrous metals are being poured. One of the problems is "erosion," which occurs when molten metal contacts the mold or core surfaces during the pouring process, resulting in the sand being dislodged at the point of contact. Erosion is believed to occur because the binder lacks sufficient heat resilience to maintain surface integrity until the pouring process is complete. The result of erosion is that loose sand is carried into the mold cavity by the liquid metal. This creates sand inclusions and weak areas in the casting. A dimensional defect is also created on the surface of the casting from sand loss into the metal.

U.S. Pat. No. 7,723,401, owned by the applicant, describes epoxy-acrylate binders that are used in molten metal casing and the problems of these binders with regard to erosion. The particular epoxy-acrylate binder systems of interest are used in the "cold box" process. In this well-known process, a foundry mix is prepared by mixing an appropriate refractory aggregate with a binder. After forcing the foundry mix into a pattern, a vapor is passed through the foundry mix, causing it to cure and provide a foundry shape useful as a mold or core. A typical vapor used is sulfur dioxide ($SO_2$), which may be diluted with another gas, typically nitrogen. A typical epoxy-acrylate binder system, contains an epoxy resin, a multifunctional acrylate, a hydroperoxide, a silane coupling agent, and optional diluents. The binder is mixed with an aggregate (typically sand). The molding mixture thus produced is compacted into a pattern to give it a specific shape. When the sulfur dioxide is blown into the pattern, it reacts with the hydroperoxide to form acid and free radicals. The generated acid cures the epoxy resin and the generated free radicals cure the multifunctional acrylate. The mixture is instantaneously hardened to result in the desired shape and can be used immediately in a foundry core and/or mold assembly.

As cited in U.S. Pat. No. 7,723,401, foundries have historically resorted to the use of refractory coatings. Core and mold assemblies or parts thereof are dipped into, flowed or sprayed with a slurry consisting of a high melting refractory oxide, a carrier such as water or alcohol, and thixotropic additives. When dried on a mold or core surface, the coating very effectively prevents erosion, in most cases. The problem with this approach is that the coating operation is messy, adds complexity to the sand casting process, and requires expensive gas fired, microwave, or radiant energy ovens to dry the wash onto the core surface. When the core and/or molds are heated during the drying process, the strength of the organic binder-to-aggregate bond weakens significantly. This results in problems handling the hot cores and reduction in productivity due to distortion or cracking of the core or mold.

Commercially-available epoxy-acrylate binder systems that provide very high hot strength, tensile strength and erosion resistance are available. However, many of these systems have at least one high-cost component.

It is, therefore, a desirable and unmet need in the prior art to reduce the cost of the epoxy-acrylate binder system while maintaining or improving the erosion resistance provided thereby.

SUMMARY

These shortcomings of the prior art are overcome at least in part by the present invention, which pertains to a binder system for a "cold box" process in which a major amount of a bisphenol F epoxy resin in the binder system is replaced by a bisphenol A epoxy resin that has been modified by reaction with methylene diphenyl diisocyanate.

Specifically, a binder system for a "cold box" process comprises an epoxy resin component, of which between 65 and 88% by weight is a bisphenol epoxy resin having oxazolidone rings incorporated into an epoxy backbone thereof. It also comprises an acrylate monomer, a free radical initiator; and a plasticizer.

Expressed in another manner, the binder system is one in which the bisphenol epoxy resin having oxazolidone rings incorporated into an epoxy backbone thereof amounts to between 31 and 41% by weight of the total binder system.

In many of the embodiments, the binder system is provided in a first part and a second part that are kept separated from each other until use. In these systems, all of the acrylate monomer is provided in the first part and all of the free radical initiator is provided either in the second part or in a separate third part.

In many of the embodiments, the free radical initiator is an organic hydroperoxide, especially cumene hydroperoxide.

In almost all of the embodiments, the binder system will also comprise at least one organic solvent; and at least one performance additive.

In many of the embodiments, the acrylate monomer is trimethylol propane triacrylate (TMPTA).

The bisphenol epoxy resin having oxazolidone rings incorporated into an epoxy backbone thereof is the reaction product of diglycidyl ether of bisphenol A with a methylene diphenyl diisocyanate. In many of these embodiments, the methylene diphenyl diisocyanate is a uretonimine-modified diisocyanate.

In many embodiments, the epoxy resin component further comprises at least one of: an epoxidized bisphenol F resin and a phenolic resole resin.

The binder system can be used to produce a foundry mix that comprise a major amount of foundry aggregate mixed therewith. In such a case, the foundry aggregate amounts to more than 90% by weight of the foundry mix.

Some embodiments of the invention also relate to a "cold box" process for forming a foundry shape, comprising the steps of:

introducing the foundry mix into a pattern to form a foundry shape;

contacting the formed foundry shape with a vaporous curing catalyst capable of curing the formed foundry shape until the formed foundry shape is sufficiently cured to be handleable; and removing the formed and cured foundry shape from the pattern.

In such a process, the preferred vaporous curing catalyst is sulfur dioxide.

BRIEF DESCRIPTION OF THE DRAWINGS

The inventive concept will be better understood when reference is made to the following tables and figures that are appended hereto, wherein.

DETAILED DESCRIPTION OF THE PREFERRED EMBODIMENTS

An exemplary binder system for erosion resistance as known in the prior art is sold commercially by the applicant under the trademark ISOSET THERMOSHIELD. This system is sold as a two-part formulation. The first part, ISOSET Part 4480, sold commercially by the applicant, can be generally described as consisting of EPALLOY 8230 and cumene hydroperoxide. Of these, EPALLOY 8230, sold commercially by CVC Specialty Chemicals, Inc., of Moorestown, N.J., is a very low viscosity epoxidized Bisphenol F resin which combines low hydrolyzable chlorides with a high degree of reactivity and outstanding chemical resistance. It is non-crystallizing and compatible with all standard curatives and most resin systems and solvents. EPALLOY 8230 is derived from Bisphenol F (BPF, CAS Reg. No. 620-92-8).

The second part of the system, ISOSET Part 4491, also sold commercially by the applicant, can be generally described as consisting of a Bisphenol A epoxy resin, a Bisphenol F epoxy resin, kerosene, trimethylol propane triacrylate (TMPTA), an epoxy functional silane, and SR 238, a hexanediol diacrylate (HDDA, CAS Reg, No, 88250-32-2), which may be sourced from Sartomer. As in the first part, the Bisphenol F epoxy resin will typically be EPALLOY 8230. The Bisphenol A epoxy resin may be provided as EPON 828, sold commercially by Momentive Performance Materials. EPON 828 is a liquid epoxy resin that is a liquid reaction product of epichlorohydrin and Bisphenol A (BPA, CAS Reg. No. 80-05-7). The epoxy functional silane component may be provided as SILQUEST A-187, commercially available from Momentive Performance Materials.

Because the Bisphenol F epoxy resin is present in both parts of the system, it can be readily determined that the overall binder system amounts to in excess of 43% by weight of the Bisphenol F epoxy resin.

For a variety of reasons, BPA is considered a commercial chemical, while BPF is a specialty chemical, resulting in BPF being much more expensive on a per pound basis. However, if BPA could be chemically modified, the modified BPA may be a suitable substitute for BPF in the binder system by providing an increased erosion resistance.

One method of modifying the BPA would be to incorporate oxazolidone rings into the diglycidyl ether of bisphenol A (DGEBA) that is found in the BPA epoxy resin. A candidate reaction for this would be the modification of the DGEBA with a methylene diphenyl diisocyanate (MDI, CAS Reg. No. 101-68-8), particularly a modified MDI, for example, the SUPRASEC line of products from Huntsman Polyurethanes, and, specifically, SUPRASEC 2385, a uretonimine-modified methylene diisocyanate. It is known from the literature that FTIR analysis indicates the presence of oxazolidone by a band at 1754 $cm^{-1}$. Also, an epoxy band is known to occur at 910 $cm^{-1}$, an isocyanurate band at 1710 $cm^{-1}$ and an isocyanate band is known at 2270 $cm^{-1}$. These bands would be expected to be present at the beginning of the reaction and their reduction and disappearance would confirm the complete consumption of epoxy groups and the absence of trimeric isocyanate, an intermediate product, in the modified resin.

To test this, 236.75 g of EPON 828 epoxy resin and 13.25 g of SUPRASEC 2385 modified MDI, for a total weight of 250 g, were added to a 500 ml three-neck flask and heated to 80° C. in 50 minutes, by increasing the temperature by 1.05° C./min. Once the reactants were at 80° C., a Brookfield CAP 2000L an initial viscosity of 3.2 P was measured at 300 rpm, 60° C., using a #4 spindle and 1.4 g of MDI was added. The temperature was held at 80° C., taking viscosity measurements every 10 minutes until the viscosity did not increase more than 5% over the 10 minute duration. Once the viscosity measurements were started, additional MDI was added at each interval. Data gathered, including elapsed time, refractive index (R.I.) and viscosity, are shown below as Table 1. A graphical presentation of viscosity plotted against time from the experiment is graphically at FIG. 1. Data were collected for 100 minutes until the end was called. A sample was collected for FTIR at each interval and kept on dry ice to avoid further reaction.

TABLE 1

Figure 1:
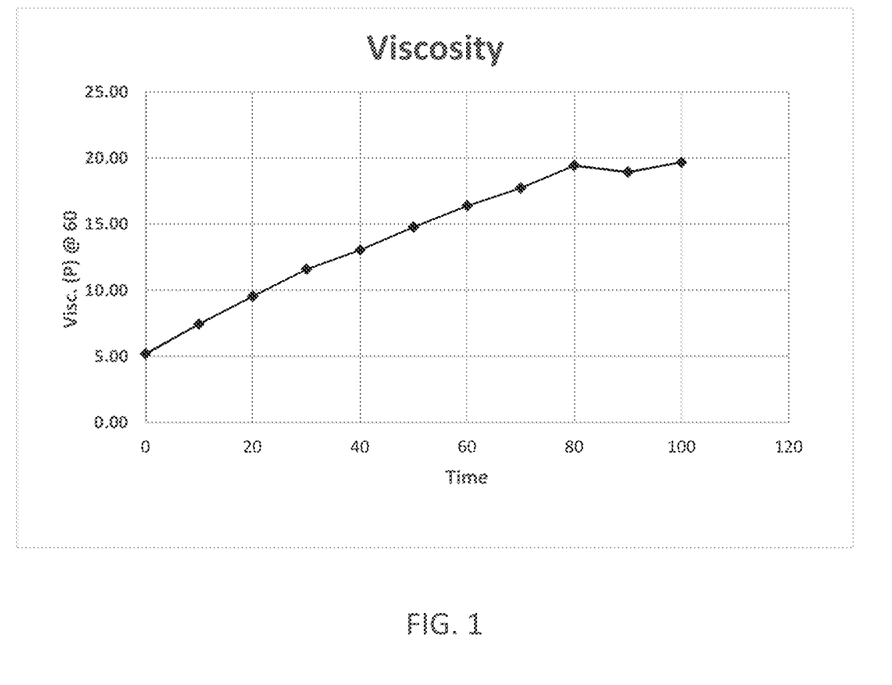
FIG. 1 graphically depicts viscosity against time for the reaction mix from the Table 1 experiment.

| Minutes into Stage | MDI added (g) | Refract. Index | Viscosity (P) | Visc. change (%) |
| --- | --- | --- | --- | --- |
| Initial | 1.4 | 1.5722 | 3.20 | n/a |
| 0 | 1.99 | 1.5759 | 5.20 | 38.5 |
| 10 | 1.75 | 1.5765 | 7.45 | 30.2 |
| 20 | 3.04 | 1.577 | 9.55 | 22.0 |
| 30 | 1.92 | 1.577 | 11.60 | 17.7 |
| 40 | 2.89 | 1.5773 | 13.05 | 11.1 |
| 50 | 2.35 | 1.5776 | 14.80 | 11.8 |
| 60 | 5.72 | 1.5777 | 16.40 | 9.8 |
| 70 | 3.43 | 1.5777 | 17.75 | 7.6 |
| 80 | 5.69 | 1.5777 | 19.45 | 8.7 |
| 90 | 4.16 | 1.5778 | 18.95 | −2.6 |
| 100 | 5.96 | 1.5778 | 19.70 | 3.8 |

Figure 2:
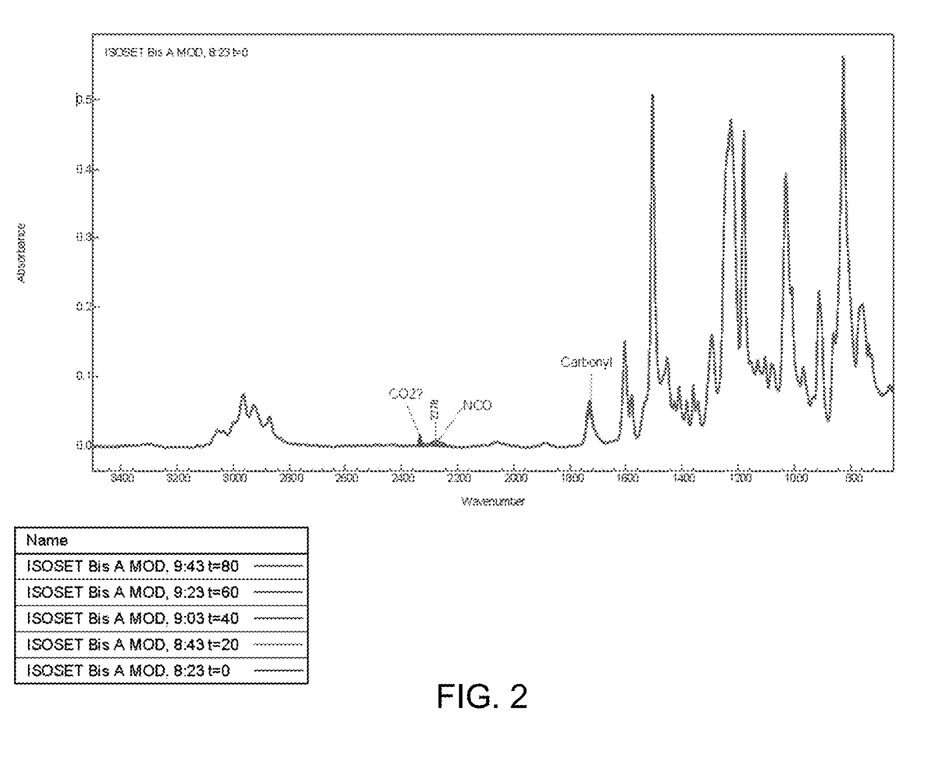
FIG. 2 is a graphical presentation of overall Fourier Transform Infrared spectroscopy ("FTIR") spectra of the reaction products with time.
Figure 3:
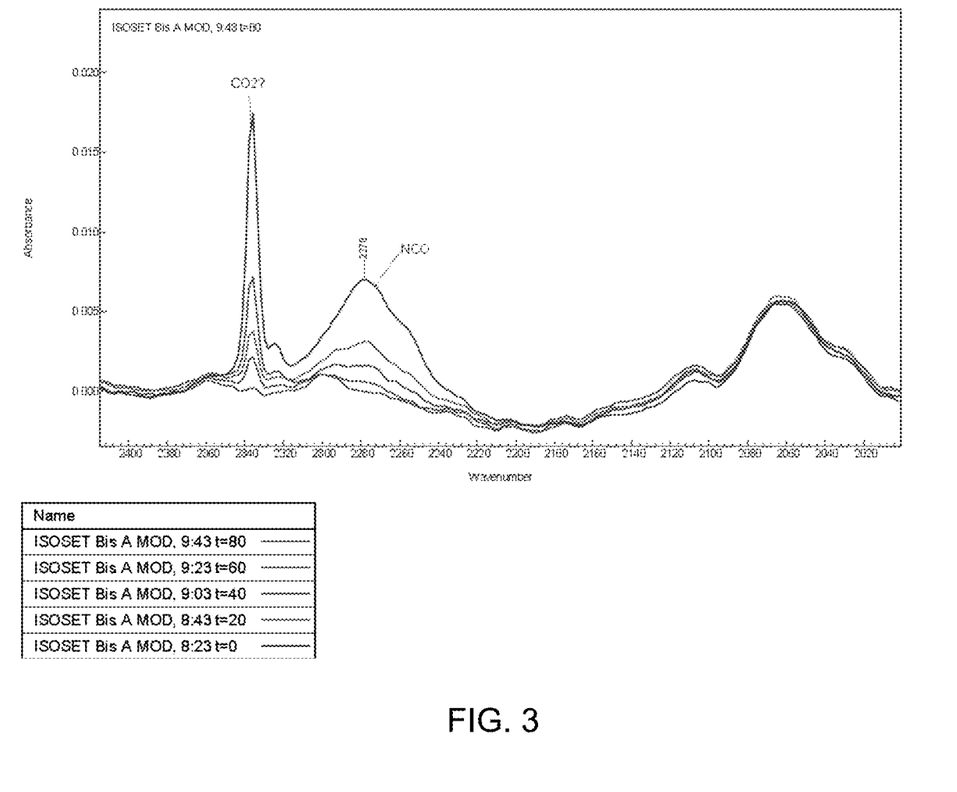
FIG. 3 is a graphical presentation of amplified FTIR spectra exhibiting a decrease in isocyanate content.

FIGS. 2 and 3 graphically present FTIR scans showing the progress of the reaction with time. The goal of the reaction is synthesizing oxazolidones using DGEBA and MDI to incorporate the oxazolidone ring into the epoxy backbone. The important FTIR bands have been noted above. The scans in FIGS. 2 and 3 show the expected effects, that is, that the band at 2270 $cm^{-1}$ decreases and the band at 1754 $cm^{-1}$ starts growing, indicating formation of the oxazolidone ring.

Once the band at 2270 cm$^{-1}$ has almost flattened out, it can be considered that the reaction is over and the desired product has been formed.

In addition to FTIR analysis, molecular weight analysis was conducted for the BPA epoxy resin prior to the reaction and the modified BPA epoxy resin prepared by the reaction. The samples were dissolved in tetrahydrofuran (THF) and analyzed by gel permeation chromatography (GPC) on the medium column set, in accordance with test standard SEA-4716. The samples were filtered through 0.45 micron filters prior to analysis. The analysis was performed under conditions suitable for medium molecular weights, using a Waters STYRAGEL HR4/HR2 column set at 35° C. with a mobile phase of THF at a flow of 1 ml/min. Monomers and solvents were excluded from the integration and the calibration was performed using monodisperse polystyrene standard obtained from Polymer Laboratories. The unmodified BPA epoxy resin had a number average molecular weight ($M_n$) of 406, and the value for the reaction product was 465. The mass average molecular weight ($M_w$) increased from 459 in the unmodified BPA to 3083 in the modified resin. From these data, it is seen that the polydispersity index (Pdi) increased from 1.13 in the unmodified BPA epoxy resin to 6.63 in the modified product. The polymer average molecular weight ($M_p$) remained unchanged at 372.

The above data effectively demonstrate the ability to modify a BPA epoxy resin with MDI, with the apparent result of incorporating oxazolidone rings into the diglycidyl ether of bisphenol A (DGEBA) that is found in the BPA epoxy resin. It was then necessary to demonstrate that this reaction product may be efficaciously used in a binder system, especially a "cold box" binder system, to reduce erosion resistance.

To this end, a series of experiments were conducted to test two-part binder systems by preparing test specimens for tensile strength and erosion resistance, using a known and accepted method that is described in U.S. Pat. No. 9,889,497 to the applicant herein. In such a test, a two-part binder system is selected for a "cold box" technique in which an epoxy-acrylic binder is used in conjunction with sulfur dioxide as the curing gas. The molding sand selected was from Badger. The binder system was added in a 50/50 ratio of Part I/Part II, at an amount of 1.25 wt % based on the sand. After being mixed with the molding sand, the resulting foundry mixture was formed into "dogbones" and was cured with 35% sulfur dioxide blended in nitrogen, according to conventional industry practice. Tensile strength was measured for each system at 30 seconds, 5 minutes, 1 hour, and 24 hours after curing. At 24 hours, one dogbone was tested at standard humidity conditions and a second was tested at 90% relative humidity, due to known problems with tensile strength with binder systems under high humidity conditions.

Of the eight systems tested, four of the systems (Samples 1, 2, 7 and 8) were comparative examples that were not according to the invention. Of these, Samples 1, 7 and 8 contained commercially-available components sold by ASK Chemicals, as will be identified below. Sample 2 is a comparative example and not according to the invention, because it contains no modified BPA epoxy resin. Samples 3 through 6 modified BPA epoxy resin in at least one of the parts.

Sample 1

Sample 1 consisted of ASK Chemicals ISOSET 4450 as the first part and ASK Chemicals ISOSET 4451 as the second part, both of which are commercially available. Of these, ISOSET 4450 contains BPA epoxy resin, dioctyl adipate (DOA), kerosene, and cumene hydroperoxide. ISOSET 4451 contains BPA epoxy resin, DOA. kerosene, TMPTA, SILQUEST A-187 and oleic acid.

Sample 7

Sample 7 consisted of the ISOSET THERMOSHIELD binder system having parts designated as ISOSET THERMOSHIELD 4480 and ISOSET THERMOSHIELD 4491. The compositions of each are described above, at the beginning of the Detailed Description, so they are not repeated here. As BPF epoxy resin is in both parts, it is not a composition according to the invention.

Sample 8

Sample 8 consisted of a two part binder system using commercially-available ASK Chemicals Parts ISOSET THERMOSHIELD 4480 (as in Sample 7) and ISOSET THERMOSHIELD 4495. Part 4495 differs from Part 4491, as it contains EPALLOY 8230, TMPTA, SYLFAT 95, SILQUEST A-187 and hydroquinone. Of these, all are described above except for SYLFAT 95, which is a tall oil fatty acid often used for emulsification, commercially available from Arizona Chemical Company, LLC.

Samples 2 and 3

As stated, Sample 2 is not according to the invention, as it contained no BPA epoxy resin that had been modified with MDI in the manner described above. However, Sample 3 was formulated with BPA epoxy resin modified with MDI, so it is according to the invention.

The first part of Sample 2 contained (by weight) 59% BPA epoxy resin, 8.5% DOA, 2.5% kerosene and 30% cumene peroxide. The first part of Sample 3 was identical, except that 59% of BPA epoxy resin modified with MDI was substituted for the 59% BPA epoxy resin.

Similarly, the second part of Samples 2 and 3 differed by a single component. Sample 2's second part had (by weight) 23% BPA epoxy resin, 12% phenolic resole resin concentrate, 8.5% DOA, 2.5% kerosene, 50% TMPTA, 3.05% SILQUEST A-187 and 0.95% oleic acid, while the second part of Sample 3 contained 23% BPA epoxy resin modified by MDI. The phenolic resole resin concentrate is a 90% by weight solution of a highly methylated benzylic ether phenolic resole resin in propylene carbonate, which may be prepared by the procedure provided in U.S. Pat. No. 5,756, 640. It has an F/P ratio of 1.75, as well as an ether to methylene bridge ratio (EMBR) of 1.41 and a degree of methyl capping of 56%.

Samples 4 and 5

Samples 4 and 5 are both according to the invention.

The second part of Samples 4 and 5 was identical to the second part of Sample 3, that is, it contained 23% by weight of BPA epoxy resin modified by MDI.

Sample 6

Sample 6 is according to the invention and differs in its first part from Sample 5, because Sample 5 contained 39% by weight of BPA epoxy resin modified by MDI, while Sample 6 contained 19% BPA epoxy resin modified by MDI and 20% EPALLOY 8330, sold commercially by CVC Specialty Chemicals, Inc., of Moorestown, N.J. EPALLOY 8330 is described by its producer as a 3.6 functional epoxy phenol novolac resin exhibiting lower viscosity than competitively available commercial alternates.

The second part of the Sample 6 binder system was identical to the second part of Samples 3-5, that is, it contained 23% by weight of BPA epoxy resin modified by MDI, 12% phenolic resole resin concentrate, 8.5% DOA, 2.5% kerosene, 50% TMPTA, 3.05% SILQUEST A-187 and 0.95% oleic acid.

Tensile Strength Results

Figure 4:
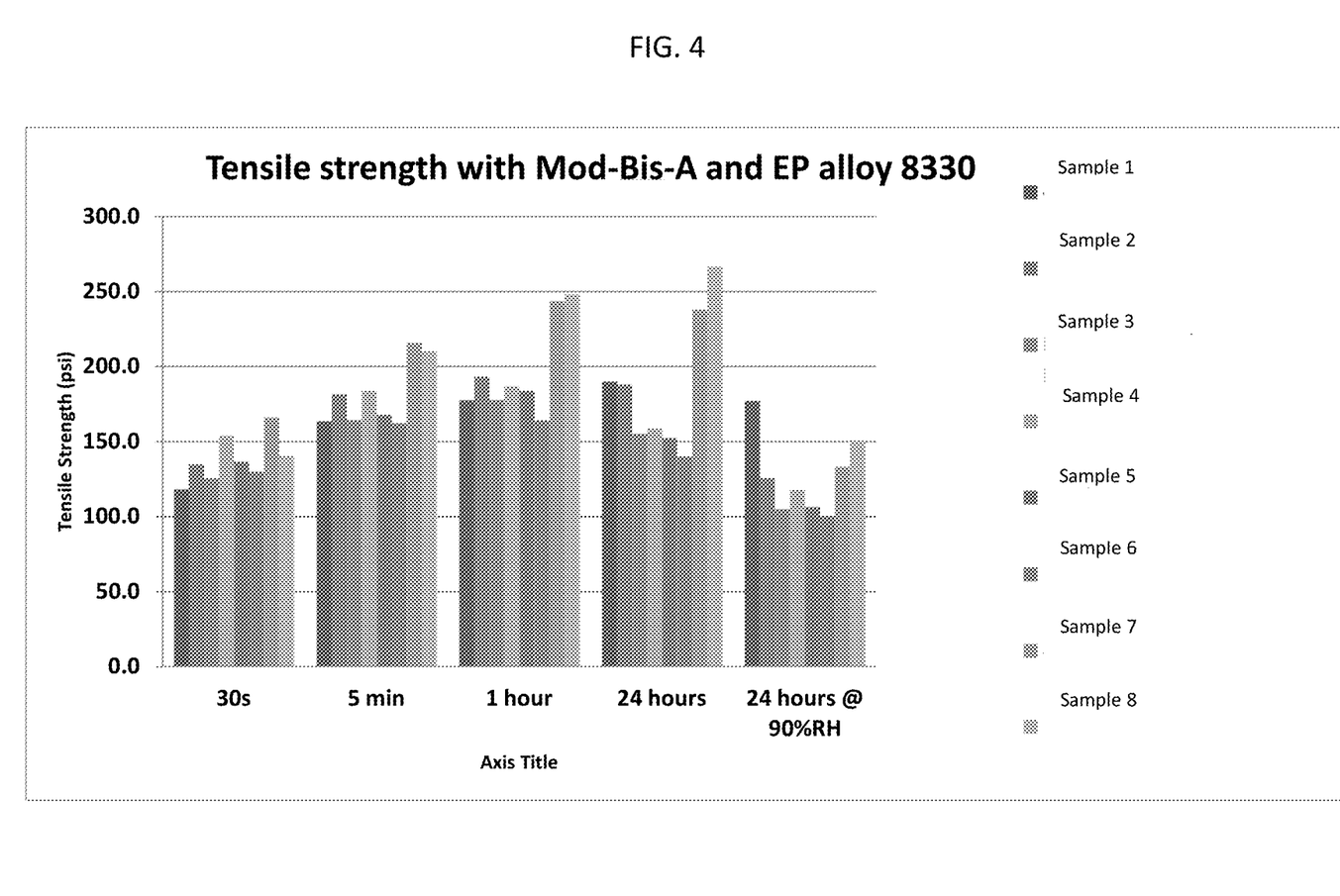
FIG. 4 is a graphical presentation of tensile strength data from test samples made using the sample formulations.
Figure 5:
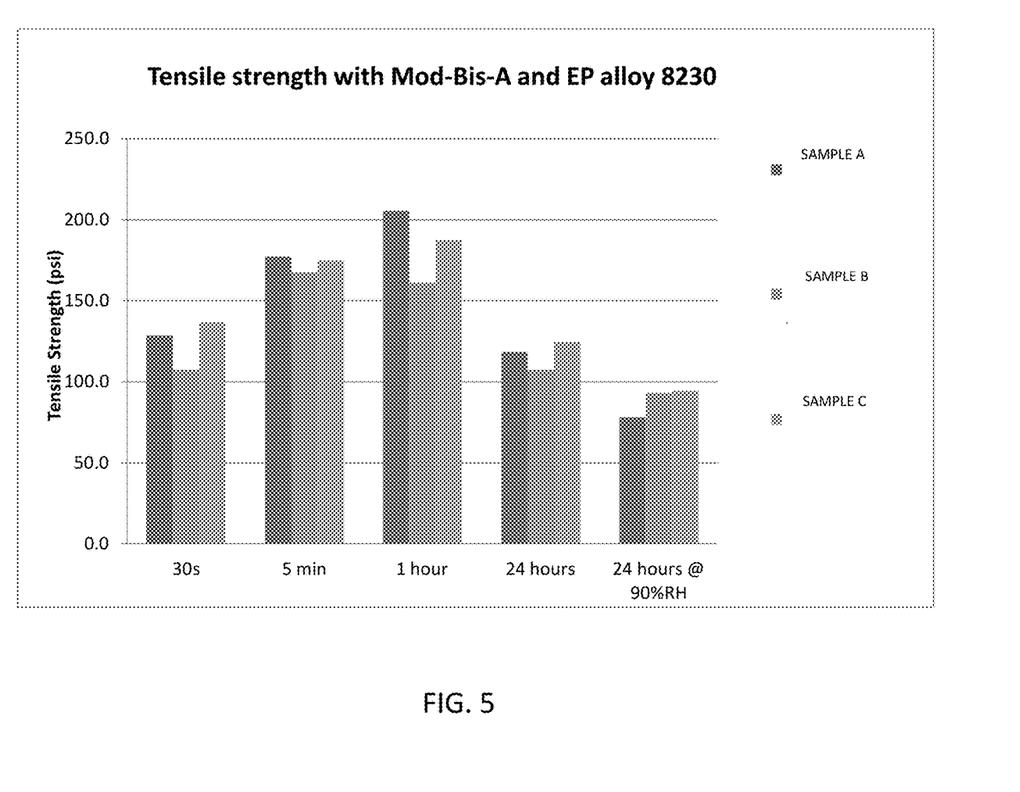
FIG. 5 is graphical presentation of tensile strength data collected from test samples made using a second set of sample formulations.

The data from the tensile strength testing is shown in FIG. 4, wherein the tensile strengths of Samples 1 to 8 are presented as a set of bars, in increasing sequential order from left to right. It is notable that Samples 3-6, which are the embodiments according to the invention demonstrate tensile strength that is comparable with that of the commercial systems in Samples 1, 2, 7 and 8, except at 24 hours. In seeking to improve erosion resistance, it must be kept in mind that unless a threshold tensile strength is provided, the improvement in erosion resistance is meaningless.

Erosion Resistance

As taught in U.S. Pat. No. 7,723,401, erosion wedge test cores were made with the formulations given above and evaluated for erosion resistance. The shape of the erosion wedge and a diagram of the test method are shown in FIG. 7 of "Test Casting Evaluation of Chemical Binder Systems", W L Tordoff et al, AFS Transactions, 80-74, (pages 152-153), developed by the British Steel Casting Research Association, which is hereby incorporated by reference. According to this test, molten iron is poured through a pouring cup into a 1-inch diameter by 16-inch height sprue and impinges upon the sand surface at an angle of 60° to fill a wedge-shaped cavity.

When the mold cavity is filled, pouring is stopped and the specimen is allowed to cool. When cool, the erosion wedge test casting is removed and the erosion rating determined. If erosion has occurred, it shows up as a protrusion on the slant side of the cast test wedge. Resistance to erosion was evaluated based on the results of the tests and the uncoated cores made with the binders. The severity of the erosion is indicated by assigning a numerical rating: 1=Excellent, 2=Good, 3=Fair, 4=Poor, 5=Very poor. This is a very severe erosion test. A rating of 1 or 2 generally implies excellent erosion resistance in actual foundry practice, if the same aggregate, binder type and application levels are used. A rating of 3 or higher indicates that a refractory coating is needed. In some tests where erosion is particularly severe, a rating of 5+ may be given, indicating off-scale erosion.

When these tests were conducted, Samples 1 and 2, not according to the invention with unmodified BPA epoxy resin, were not acceptable, with a rating of 5. Samples 7 and 8 were acceptable at a rating of about 2, but both are commercial systems with BPF epoxy resin and are not according to the invention. Samples 3 and 5, with modified BPA epoxy resin at 59% and 39% by weight (and 20% EPALLOY 8330), respectively, also had an unacceptable rating of 5. However, Sample 6, with 19% modified BPA epoxy resin and 40% EPALLOY 8330, gave very good erosion resistance, although not as good as that of Sample 7.

Further Testing

These initial erosion resistance tests suggested a narrowing of the testing to more closely examine the effects of modifying BPA epoxy resin to replace some or all of the BPF epoxy resin in the commercially available binder system. Toward that end, three formulations were tested, designated as Samples A through C.

Sample A corresponds exactly to Sample 1 in the first set of experiments, that is, the first part of the binder system is the commercially-available ISOSET THERMOSHIELD 4480 and the second part is the commercially available ISOSET THERMOSHIELD 4491. Because each part contains BPF epoxy resin, BPF epoxy resin is present in the overall binder system in the range of about 40% to about 48% by weight. Sample A is not according to the invention and represents a state of the art composition.

Sample B is a variation on Sample 4 above. The first part of Sample B contained 39% by weight of the BPA epoxy resin modified by MDI, 30% by weight cumene hydroperoxide, 8.5% by weight DOA and 2% by weight kerosene. Instead of the 20% by weight of EPALLOY 8330 used in Sample 4, the remainder of the first part of Sample B was 20% by weight of EPALLOY 8230, which is understood to be primarily BPF epoxy resin. Sample B is according to the invention.

The second part of Sample B is identical to the second part of Sample 4 above.

Sample C is identical in formulation to Sample 3 in the first set of experiments. The only difference between Samples B and C are in the first part, where Sample B has modified BPA epoxy resin supplemented with EPALLOY 8230, while Sample C has only the BPA epoxy resin modified with MDI, devoid of the EPALLOY 8230.

When these samples were used as binders in a repetition of the tensile strength test conducted above, Samples B and C were both seen to provide a tensile strength that is comparable to the tensile strength of the commercially-available Sample A, which is the ISOSET THERMOSHIELD system of ASK Chemicals. Of Sample B and C, Sample C, which is devoid of EPALLOY 8230, seemed to provide better tensile strength, but the improvement may not be sufficient to justify the added cost of preparing the modified BPA epoxy resin.

When the erosion resistance tests were conducted, Sample B had an erosion resistance rating of 2, using the subjective rating system, was better that the rating of 2.5 for the control Sample A and the rating of 3 for Sample C. It is, therefore, concluded that total elimination of BPF epoxy resin is not the preferred solution, but that a system comparable to, or, in some aspects superior to, the commercial ISOSET THERMOSHIELD system can be achieved while replacing at least some of the BPF epoxy resin with the MDI-modified BPA epoxy resin.

What is claimed is:

1. A binder system for a "cold box" process, comprising:
    a first part, comprising an acrylate monomer; and
    a second part, comprising a bisphenol epoxy resin that has been modified to have oxazolidone rings incorporated into an epoxy backbone thereof;
    a free radical initiator; and
    a plasticizer;
    wherein all of the acrylate monomer in the binder system is kept separate from the free radical initiator until use.

2. The binder system of claim 1, wherein:
    all of the acrylate monomer is provided in the first part; and
    all of the free radical initiator is provided either in the second part or in a separate third part.

3. The binder system of claim 2, wherein:
    the free radical initiator is an organic hydroperoxide.

4. The binder system of claim 3, wherein:
the organic hydroperoxide is cumene hydroperoxide.
5. The binder system of claim 1, wherein:
the free radical initiator is an organic hydroperoxide.
6. The binder system of claim 5, wherein:
the organic hydroperoxide is cumene hydroperoxide.
7. The binder system of claim 1, further comprising:
at least one organic solvent; and
at least one performance additive.
8. The binder system of claim 1, wherein:
the acrylate monomer is trimethylol propane triacrylate (TMPTA).
9. The binder system of claim 1, wherein:
the bisphenol epoxy resin modified to have oxazolidone rings incorporated into an epoxy backbone thereof is the reaction product of diglycidyl ether of bisphenol A with a methylene diphenyl diisocyanate.
10. The binder system of claim 9, wherein:
the methylene diphenyl diisocyanate is a uretonimine-modified diisocyanate.
11. The binder system of claim 1, wherein:
the second part further comprises at least one of: an epoxidized bisphenol F resin and a phenolic resole resin.

12. A foundry mix, comprising:
a major amount of foundry aggregate; and
a binder system, comprising the composition of claim 1.
13. A "cold box" process for forming a foundry shape, comprising the steps of:
introducing the foundry mix of claim 12 into a pattern to form a foundry shape;
contacting the formed foundry shape with a vaporous curing catalyst capable of curing the formed foundry shape until the formed foundry shape is sufficiently cured to be handleable; and
removing the formed and cured foundry shape from the pattern.
14. The process of claim 13, wherein:
the vaporous curing catalyst is sulfur dioxide.
15. The binder system of claim 1, wherein:
the bisphenol epoxy resin modified to have oxazolidone rings incorporated into an epoxy backbone thereof amounts to between 31 and 41% by weight of the total binder system.
16. The binder system of claim 1, wherein the plasticizer is dioctyl adipate ("DOA").

* * * * *